(12) United States Patent
Edwards et al.

(10) Patent No.: US 11,349,845 B2
(45) Date of Patent: *May 31, 2022

(54) WEBSITE VERIFICATION PLATFORM

(71) Applicant: Capital One Services, LLC, McLean, VA (US)

(72) Inventors: Joshua Edwards, Philadelphia, PA (US); Abdelkadar M'Hamed Benkreira, Washington, DC (US); Michael Mossoba, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,513

(22) Filed: Feb. 28, 2020

(65) Prior Publication Data

US 2020/0358781 A1    Nov. 12, 2020

Related U.S. Application Data

(63) Continuation of application No. 16/406,474, filed on May 8, 2019, now Pat. No. 10,581,866.

(51) Int. Cl.
*G06F 7/04* (2006.01)
*G06F 15/16* (2006.01)
(Continued)

(52) U.S. Cl.
CPC ........ *H04L 63/102* (2013.01); *H04L 63/0876* (2013.01); *H04L 63/105* (2013.01)

(58) Field of Classification Search
CPC . H04L 63/102; H04L 63/0876; H04L 63/105; H04L 63/10
See application file for complete search history.

(56) References Cited

U.S. PATENT DOCUMENTS 8,533,226 B1    9/2013   Fox et al.
8,583,448 B1 *  11/2013  Harrison, Jr. .......... G06Q 30/02
                                              705/1.1
(Continued)

OTHER PUBLICATIONS

Amazon Web Services, Inc., "Amazon SES Domain Verification TXT Records," May 18, 2018, 3 pages. Retrieved from Internet:[URL:https://docs.aws.amazon.com/ses/latest/DeveloperGuide/dns-txt-records.html].

(Continued)

*Primary Examiner* — Trong H Nguyen
(74) *Attorney, Agent, or Firm* — Harrity & Harrity, LLP

(57) ABSTRACT

A device may provide a verification indicator to a device associated with a website. The verification indicator may be associated with verifying access to the website. The device may detect that the verification indicator has been associated with code associated with the website based on processing the code. The device may provide a script to the device. The script may be included in the code. The script may be associated with monitoring operations of the website. The device may receive data related to the operations. The device may analyze the data using a model. The model may be associated with making a prediction related to at least one of: a value to be received via the website, or traffic associated with the website. The device may perform one or more actions related to the website based on a result of the analyzing.

20 Claims, 11 Drawing Sheets

(51) Int. Cl.
*H04L 29/06* (2006.01)
*H04L 9/40* (2022.01)

(56) References Cited

U.S. PATENT DOCUMENTS

| | | | |
|---|---|---|---|
| 10,581,866 | B1 | 3/2020 | Edwards et al. |
| 2008/0059348 | A1 | 3/2008 | Glassman et al. |
| 2009/0328142 | A1* | 12/2009 | Wang .................... H04L 9/3247 726/2 |
| 2010/0251128 | A1 | 9/2010 | Cordasco |
| 2011/0179178 | A1* | 7/2011 | Fox ...................... G06F 16/9566 709/226 |

OTHER PUBLICATIONS

Amazon Web Services, Inc., "Verifying a Domain With Amazon SES," Feb. 21, 2015, 2 pages. Retrieved from Internet:[URL:https://docs.aws.amazon.com/ses/latest/DeveloperGuide/verify-domain-procedure.html].

Carroll J., "How Much Is My Website Worth? Website Valuations Guide," Aug. 16, 2016, 14 pages. Retrieved from Internet:[URL:http://blog.flippa.com/how-much-is-my-website-worth/].

Google Analytics., "Adding analytics.js to Your Site," Mar. 11, 2011, 4 pages. Retrieved from Internet:[URL:https://developers.google.com/analytics/devguides/collection/analyticsjs/].

Google., "Verify Your Domain with a TXT Record," May 9, 2019, 3 pages. Retrieved from Internet:[URL:https://support.google.com/a/answer/183895?hl=en].

MonsterInsights, LLC., "MonsterInsights Blog," Jan. 2, 2019, 15 pages. Retrieved from Internet:[URL:https://www.monsterinsights.com/how-does-google-analytics-work-beginners-guide/].

Squarespace., "Domain Verification with a TXT Record (Alternative Method)," Feb. 15, 2019, 6 pages. Retrieved from Internet:[URL:https://support.squarespace.com/hc/en-us/articles/205812388-Domain-verification-with-a-TXT-Record-alternative-method-].

W3 Business Advisors., "Internet Business Brokers Focused on One Objective. Results.," Sep. 21, 2009, 2 pages. Retrieved from Internet:[URL:https://www.w3businessadvisors.com/free-business-evaluation/].

\* cited by examiner

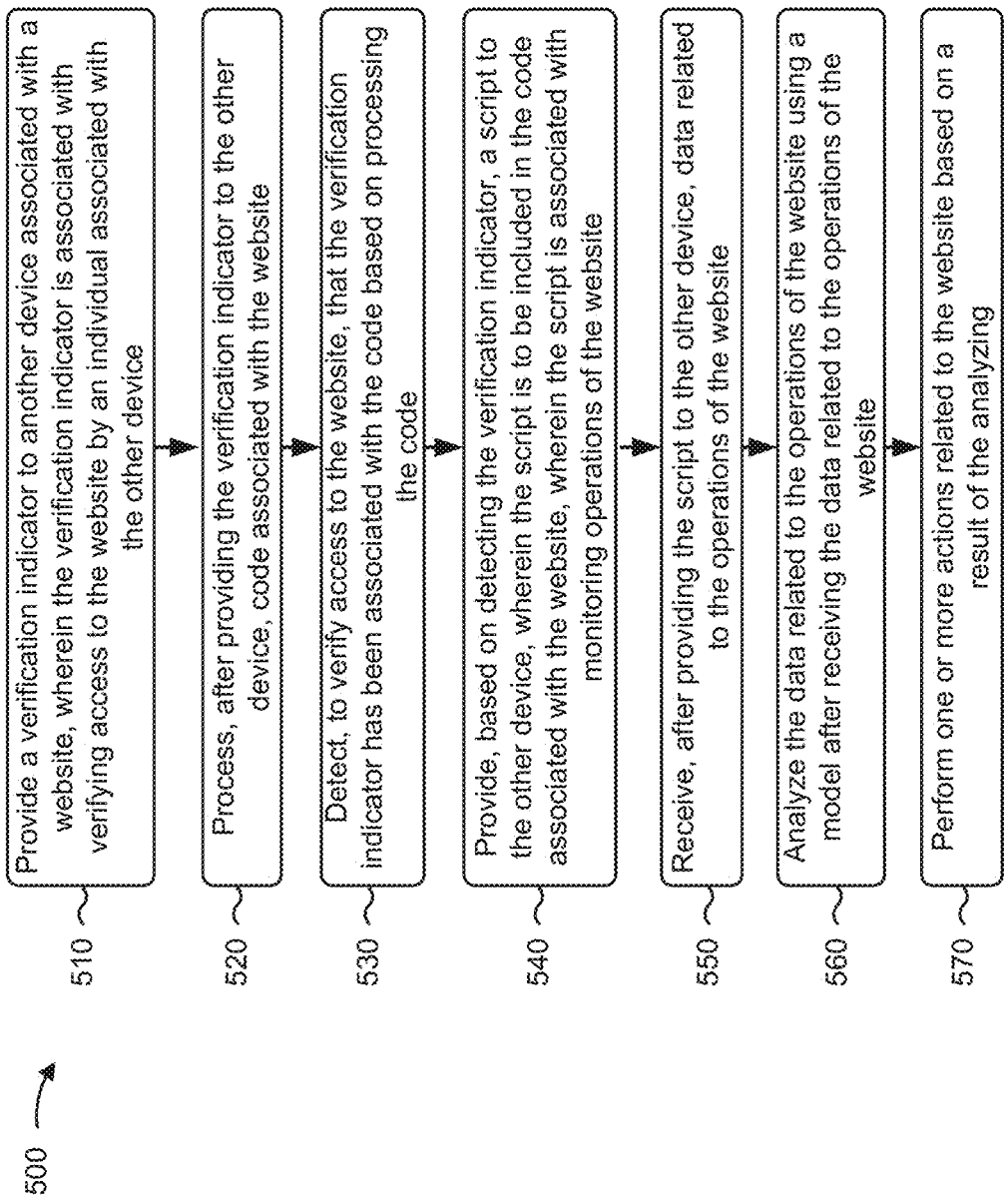

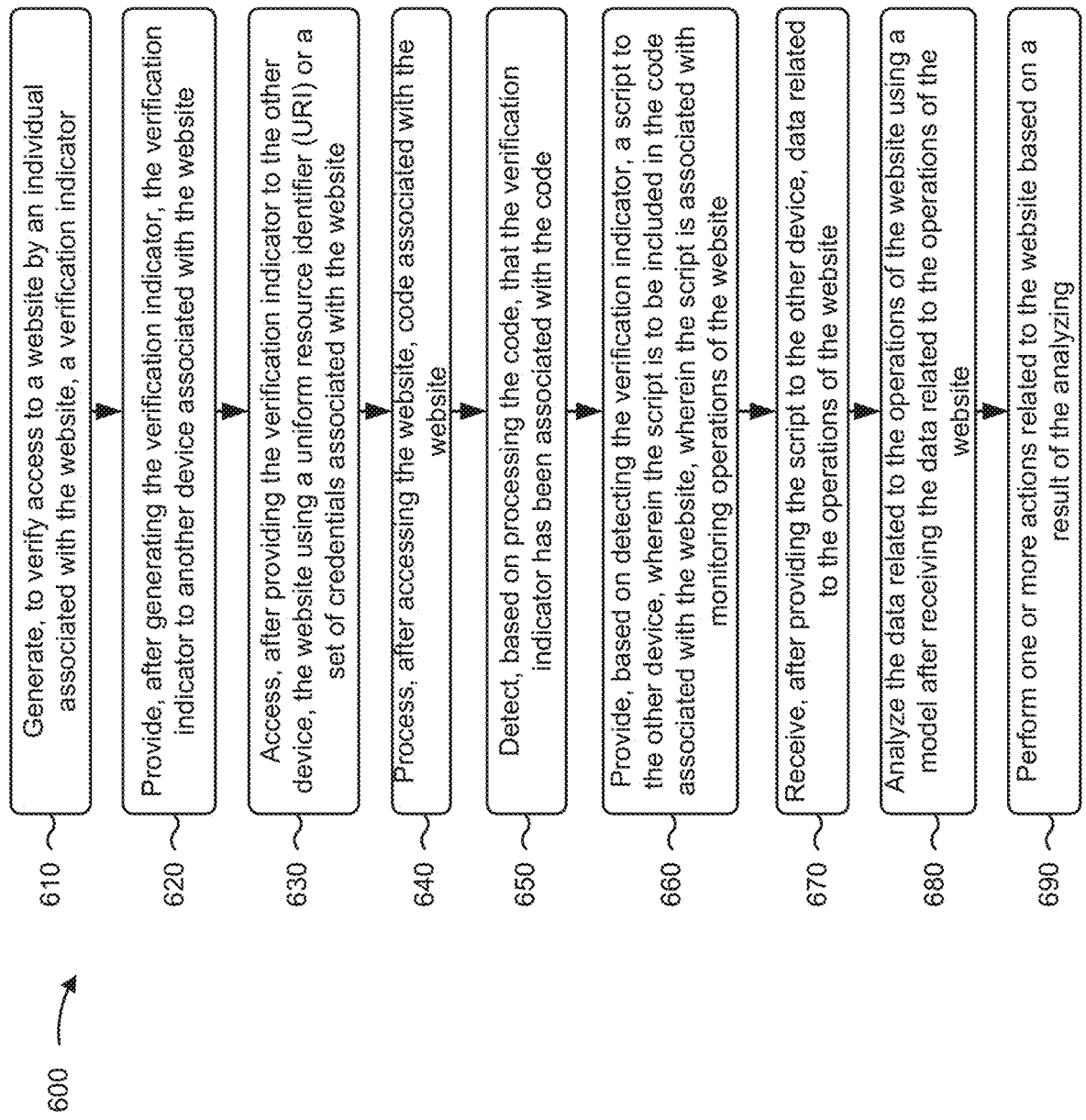

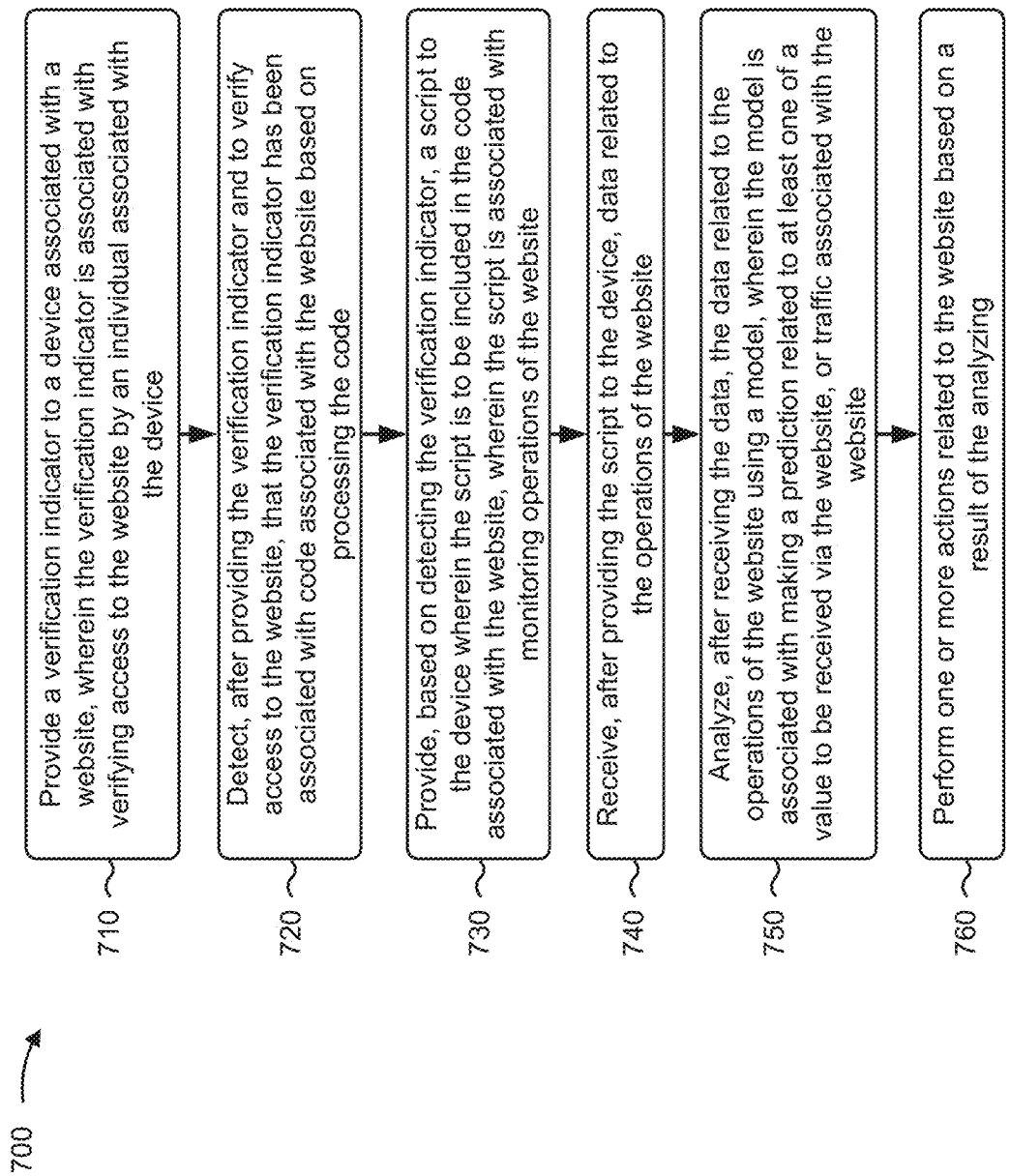

WEBSITE VERIFICATION PLATFORM

RELATED APPLICATION

This application is a continuation of U.S. patent application Ser. No. 16/406,474, filed May 8, 2019 (now U.S. Pat. No. 10,581,866), which is incorporated herein by reference.

BACKGROUND

An owner of a website is a person who is responsible for maintaining the website. For example, the owner is responsible for ensuring that web servers, software, and/or the like are operating correctly, for designing the website, for generating and revising web pages of the website, and/or the like. The owner and/or other individuals associated with the owner may access the website, or an administrator account, using a set of credentials.

SUMMARY

According to some implementations, a method may include providing, by a device, a verification indicator to another device associated with a website, wherein the verification indicator is associated with verifying access to the web site by an individual associated with the other device; processing, by the device and after providing the verification indicator to the other device, code associated with the website; detecting, by the device and to verify access to the website, that the verification indicator has been associated with the code based on processing the code; providing, by the device and based on detecting the verification indicator, a script to the other device, wherein the script is to be included in the code associated with the website, wherein the script is associated with monitoring operations of the website; receiving, by the device and after providing the script to the other device, data related to the operations of the website; analyzing, by the device, the data related to the operations of the website using a model after receiving the data related to the operations of the website; and performing, by the device, one or more actions related to the website based on a result of the analyzing.

According to some implementations, a device may include one or more memories; and one or more processors, communicatively coupled to the one or more memories, configured to: generate, to verify access to a website by an individual associated with the website, a verification indicator; provide, after generating the verification indicator, the verification indicator to another device associated with the website; access, after providing the verification indicator to the other device, the website using a uniform resource identifier (URI) or a set of credentials associated with the website; process, after accessing the website, code associated with the website; detect, based on processing the code, that the verification indicator has been associated with the code; provide, based on detecting the verification indicator, a script to the other device, wherein the script is to be included in the code associated with the website, wherein the script is associated with monitoring operations of the website; receive, after providing the script to the other device, data related to the operations of the website; analyze the data related to the operations of the website using a model after receiving the data related to the operations of the website; and perform one or more actions related to the website based on a result of the analyzing.

According to some implementations, a non-transitory computer-readable medium may store one or more instructions. The one or more instructions, when executed by one or more processors of a device, may cause the one or more processors to: provide a verification indicator to a device associated with a website, wherein the verification indicator is associated with verifying access to the website by an individual associated with the device; detect, after providing the verification indicator and to verify access to the website, that the verification indicator has been associated with code associated with the website based on processing the code; provide, based on detecting the verification indicator, a script to the device, wherein the script is to be included in the code associated with the website, wherein the script is associated with monitoring operations of the website; receive, after providing the script to the device, data related to the operations of the website; analyze, after receiving the data, the data related to the operations of the website using a model, wherein the model is associated with making a prediction related to at least one of: a value to be received via the website, or traffic associated with the website; and perform one or more actions related to the website based on a result of the analyzing.

BRIEF DESCRIPTION OF THE DRAWINGS

FIGS. 5-7 are flow charts of one or more example processes related to a website verification platform.

DETAILED DESCRIPTION

Figure 1A:
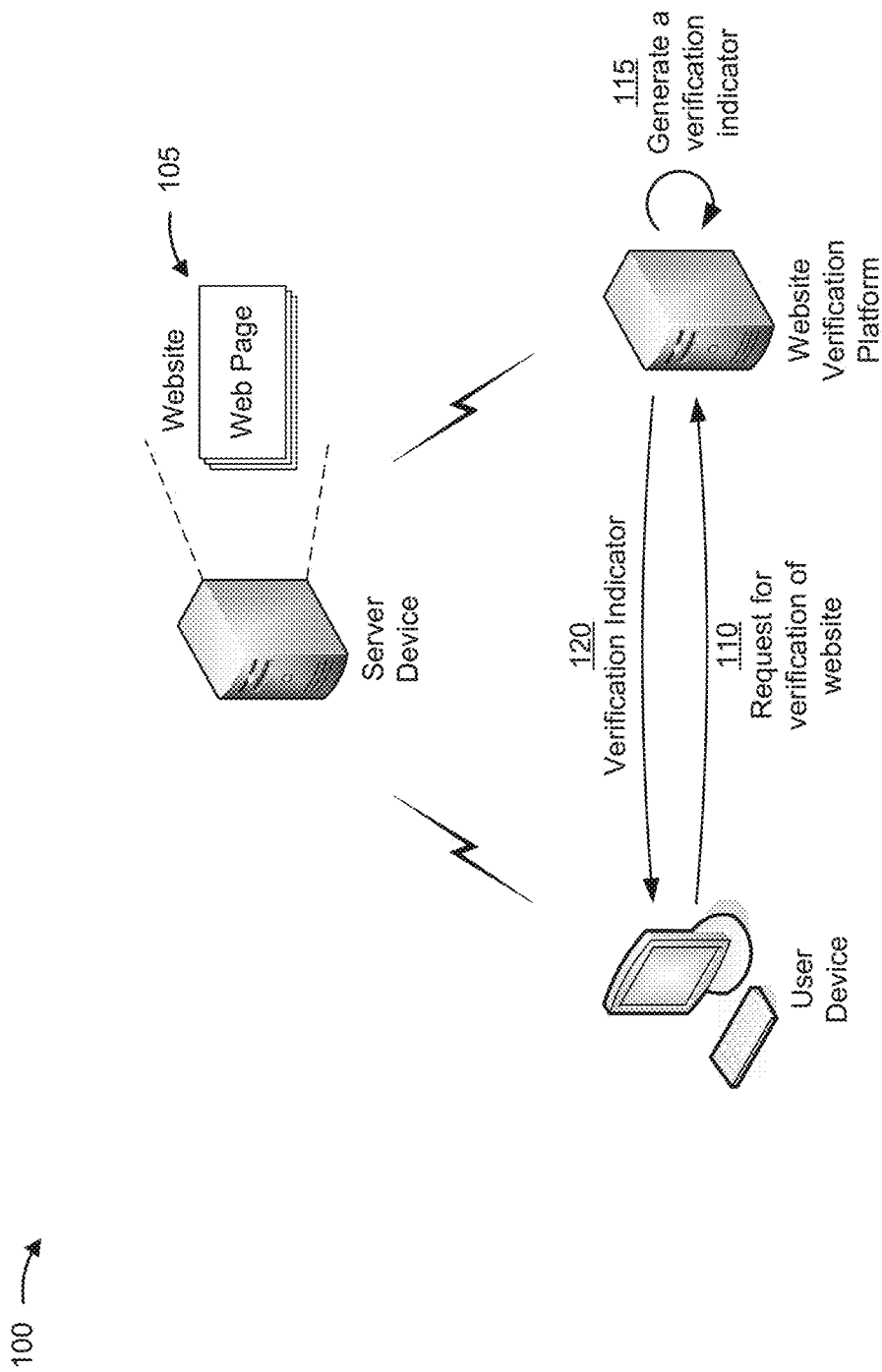
FIGS. 1A-2B are diagrams of one or more example implementations described herein.

The following detailed description of example implementations refers to the accompanying drawings. The same reference numbers in different drawings may identify the same or similar elements.

Various metrics are used to assess operations of a website. For example, an amount of visitor traffic to the website during a time period is used to assess a popularity of the website. An owner of the website may want to automatically provide data related to the various metrics to an organization for analysis. However, prior to receiving the data and/or communicating with an individual purporting to be the owner of the website, the organization needs to verify that the individual is the owner of the website. Currently, verifying ownership of a website is done via lookup of ownership records, which are often inaccurate, and/or provisioning of a set of credentials to the organization, which makes the set of credentials susceptible to theft by a malicious actor. This consumes computing resources of devices of the organization via inaccurate verification of ownership of a website, via slow verification of ownership of the website, and/or via insecure verification of the website.

Some implementations described herein provide a website verification platform that is capable of automatically and securely verifying ownership of a website. For example, the website verification platform may provide a verification indicator to an individual and the verification platform may verify ownership of the website based on inclusion of the verification indicator in code associated with the website, based on inclusion of the verification indicator in a file that stores the code, and/or the like. This conserves computing resources that would otherwise be consumed using a less efficient or less accurate process for verifying ownership of the website (e.g., performing a lookup of the ownership). In addition, this reduces or eliminates a need for a set of credentials to be provided to an organization for verification of ownership of a website, thereby improving a security of verifying ownership of the website relative to other processes for verifying ownership. In addition, the website verification platform may be capable of receiving data related to various metrics related to operations of the website even though an organization associated with the website verification platform is not the owner of the website, and performing various analyses not previously possible. For example, the website verification platform may perform analyses related to making underwriting, line of credit, or service offering determinations for the website (e.g., using one or more machine learning models). This expands a set of analyses and/or services that can be provided to an owner of a website.

FIGS. 1A-1D are diagrams of one or more example implementations 100 described herein. As shown in FIGS. 1A-1D, example implementation(s) 100 include a user device, a server device, and a website verification platform. The website verification platform may be associated with an organization, such as an organization that verifies ownership of websites on behalf of other organizations, an organization that provides services to a website and/or an owner of a website after verification of ownership of the website, and/or the like.

As shown in FIG. 1A, and by reference number 105, the server device may host a website (e.g., a collection of related web pages that include multimedia content). The server device may be owned by a party that is different than an owner of the website. The server device may store folders of various files related to publishing the website on the Internet. For example, the folders may store file folders with code documents, images, videos, text files, and/or the like that are used to generate the various web pages of the website and/or to populate the various web pages with multimedia content.

As shown by reference number 110, the user device may provide, to the website verification platform, a request for verification of the website. For example, the user device may provide the request based on input from a user of the user device (e.g., based on the user using an input component of the user device to interact with a user interface provided for display via the user device). The request may include a submission of a webform, an email, a text message, and/or the like. The request may include information that identifies the user device that sent the request, information that identifies the user of the user device, a uniform resource identifier (URI) for the website to be verified (e.g., a uniform resource locator (URL)), a timestamp for the request, a set of credentials for accessing the website, and/or the like.

As shown by reference number 115, the website verification platform may generate a verification indicator to be used to verify access to and/or ownership of the website by the individual submitting the request for verification of the website. For example, the website verification platform may generate the verification indicator after receiving the request.

The verification indicator may include a unique identifier to be included in commented code associated with the website (e.g., a unique set of characters to be included in a commented section of code of the website), new code that causes a particular web page associated with the website to be generated when executed or parsed (e.g., the new code, when included in existing code or a particular folder associated with the website, may cause a new web page to be generated for the website), a text file to be stored in association with the code on the server device that hosts the website, and/or the like. The verification indicator may be used to verify ownership of and/or access to a website by an individual. For example, an individual who is not an owner of the website, or who is not someone with authorized access to the website (e.g., with access to an administrator account associated with the website), might not be capable of including the verification indicator in code associated with the website or a file folder associated with the website (e.g., based on lacking credentials for accessing the website, based on lacking knowledge of the appropriate location to include the verification indicator, and/or the like).

Additionally, or alternatively, the verification indicator may be unique to a request, to a website, to an individual that submitted the request, to a device that submitted the request, and/or the like. In this way, and as described elsewhere herein, the website verification platform may be capable of identifying a particular request, website, individual, device, and/or the like for which access was verified based on the verification indicator ultimately included in code and/or a file folder associated with the website. This improves a security of verifying access to and/or ownership of the website, reduces or eliminates a risk of a person-in-the-middle attack that could occur during other verification methods, and/or the like.

The website verification platform may determine, prior to generating the verification indicator, a particular type of verification indicator to use as the verification indicator. For example, the website verification platform may determine whether to generate a unique identifier, new code, a text file, and/or the like as the verification indicator prior to generating the verification indicator. For example, the website verification platform may determine a particular type of verification indicator to use based on a security level associated with an account associated with the website. Continuing with the previous example, a high security level may be associated with generating a unique identifier to be included in the code of the website, whereas a medium or low security level may be associated with generating new code (e.g., a non-unique code snippet) to be included in a file folder associated with the website.

Additionally, or alternatively, and as another example, the website verification platform may determine a particular type of verification indicator to use based on the code of the website. Continuing with the previous example, a website may be coded using one or more programming languages, such as hypertext markup language (HTML), JavaScript, and/or the like, and the website verification platform may determine to generate the verification indicator such that the verification indicator conforms with the particular programming language in which the verification indicator is to be included (e.g., may determine to generate a commented snippet of HTML code if the verification indicator is to be included in HTML code, may generate new snippet of JavaScript code if the website is coded using JavaScript, and/or the like).

When generating the verification indicator, the website verification platform may use information included in the request. For example, the website verification platform may generate a unique identifier to be included in code of the website by generating a unique identifier from information that identifies the website, the individual associated with the request, the user device that provided the request to the website verification platform, a timestamp of the request, and/or the like. Continuing with the previous example, the website verification platform may combine this information into a single identifier using a hash function, by combining characters from different strings of information into a single string of information, and/or the like. Additionally, or alternatively, and as another example, the website verification platform may use the URI of the website to determine a new URI for a new web page to be generated in the case when generation of a new web page is to be used to verify access to and/or ownership of the website. Continuing with the previous example, if a URI for a homepage of the website is "https://www.site.com/home," then the website verification platform may determine a URI for a new page to be generated from the URI for the homepage (e.g., may determine that the new page is to have a URI with the same domain name as the homepage but a different page name, such as "https://www.site.com/accessproof"). In this case, inclusion of new code that causes generation of the "access-proof" web page in existing code for the website by an individual may cause the website verification platform to verify that the individual is an owner of and/or has access to the website.

Additionally, or alternatively, the website verification platform may use pre-stored information to generate the verification indicator. For example, the website verification platform may store code snippets for different programming languages (e.g., a code snippet that is a commented section of code, a code snippet that causes a new web page to be generated, and/or the like), and may use this information when generating the verification indicator. Continuing with the previous example, the website verification platform may select a code snippet depending on the programming language in which the website is coded, and may configure the code snippet for the particular website for which access is to be verified (e.g., by including a unique identifier in a commented code snippet, by including a domain name for the website and/or a new web page in the code snippet, and/or the like). Using pre-stored information facilitates quicker generation of a verification indicator relative to not using pre-stored information and conserves computing resources that would otherwise be consumed generating a verification indicator without using pre-stored information.

As shown by reference number 120, the website verification platform may provide the verification indicator to the user device. For example, the website verification platform may provide the verification indicator to the user device after generating the verification indicator. The website verification platform may provide the verification indicator to the user device in a message (e.g., a text message, an email, and/or the like), may provide a link to download the verification indicator to the user device, may populate a user interface with the verification indicator (e.g., with a unique identifier, with a code snippet, and/or the like), and/or the like.

The website verification platform may provide a set of instructions with the verification indicator to the user device. For example, the set of instructions may include information that identifies a particular web page for which the verification indicator is to be included in code, a particular file folder in which the verification indicator is to be included (e.g., an "Index" file folder), and/or the like. Continuing with the previous example, the set of instructions may include information instructing the user of the user device to include the verification indicator in code of a homepage of the website (e.g., when the verification indicator is a unique identifier), to include a document with code for a new web page in a particular file folder with other documents for other web pages of the website (e.g., when the verification indicator is new code that causes a new web page to be generated), and/or the like.

Figure 1B:
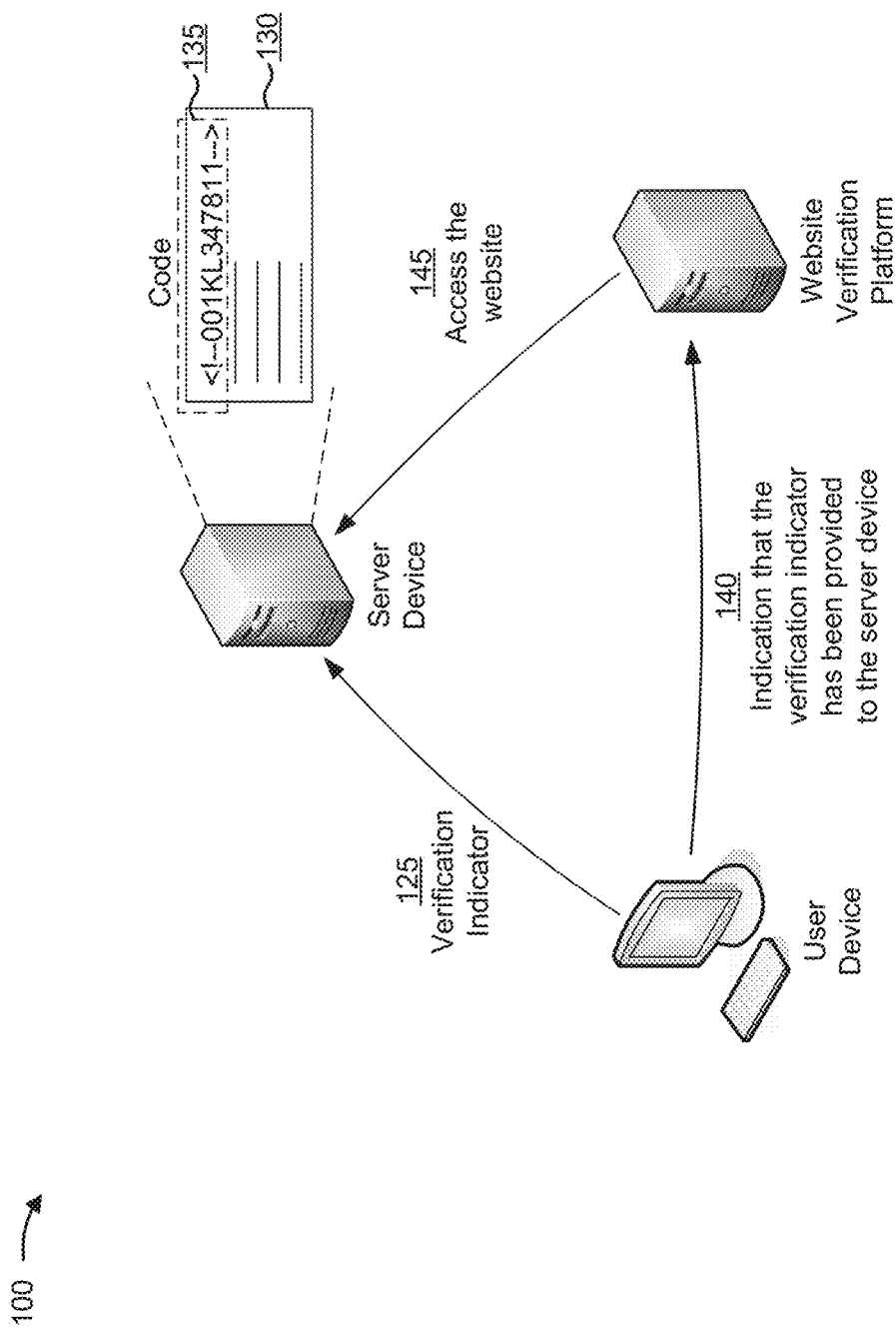

Turning to FIG. 1B, and as shown by reference number 125, the user device may provide the verification indicator to the server device. For example, the user device may provide the verification indicator to the server device after receiving the verification indicator from the website verification platform. Continuing with the previous example, the user of the user device may access code and/or file folders on the server device via a user interface, and may upload and save the verification indicator to a file folder (e.g., when the verification indicator includes new code), may access a particular code document and may include the verification indicator in the code document (e.g., when the verification indicator includes a unique identifier), and/or the like.

As a specific example, reference number 130 shows a representation of code associated with a particular web page of the website. Reference number 135 shows that the user of the user device has included a commented code snippet in the code (identified by the delimiters "<!--" and "-->") and that the commented code snippet includes a unique identifier as a verification indicator (shown as "001KL347811"). In this way, and as described elsewhere herein, when the website verification platform processes the code of the website, the website verification platform may detect the presence of the verification indicator based on the delimiters in the code, may detect the particular verification indicator, and/or the like.

As shown by reference number 140, the user device may provide, to the website verification platform, an indication that the verification indicator has been provided to the server device. For example, the user device may provide the indication after the user device has provided the verification indicator to the server device, after a user of the user device has included the verification indicator in code associated with the website, after the user of the user device has included the verification indicator in a particular file folder associated with the website, and/or the like. Continuing with the previous example, the user device may provide a message (e.g., a text message, an email, and/or the like), a form submission, and/or the like to the website verification platform to indicate that the verification indicator has been provided to the server device.

As shown by reference number 145, the website verification platform may access the website by communicating with the server device. For example, the website verification platform may access the website after receiving the indication that the verification indicator has been provided to the server device.

In some implementations, the website verification platform may access the website using a URI associated with the website (e.g., that was included in the request for verification, that was generated in association with generating the verification indicator, and/or the like). For example, the website verification platform may follow a URL to a particular web page of the website to access the website. In this case, the website verification platform may process code, text, images, and/or the like of the website to detect the verification indicator. For example, the website verification platform may scrape or crawl the code, the text, the images, and/or the like of the website to detect the verification indicator in the code, the text, the images, and/or the like. Continuing with the previous example, the website verification platform may process the code to identify a particular unique identifier included in the code, the text, the images, and/or the like, may process the code to detect if the code causes a particular web page to be generated (e.g., based on parsing and/or executing the code), and/or the like. This reduces or eliminates a need for a user of the user device to provide a set of credentials to the website verification platform, thereby reducing or eliminating a risk of theft of the set of credentials during provisioning of the set of credentials to the website verification platform.

In some implementations, the website verification platform may access the website using a set of credentials associated with the website (e.g., that were provided to the website verification platform with the request for verification). For example, the website verification platform may provide the set of credentials to the server device to log into an administrator account associated with the server device, to access program code associated with the website, and/or the like. In this case, the website verification platform may process a set of files (or code-related documents stored in the set of files) associated with the website after accessing the website. For example, the website verification platform may process the set of files to detect inclusion of the verification indicator in the set of files. Continuing with the previous example, the website verification platform may process the set of files to detect a particular file included in the set of files, to detect if the set of files (or code stored in the set of files) cause a particular web page to be generated (e.g., by executing and/or parsing the code), and/or the like. This provides a multi-factor verification of access to and/or ownership of the website, which improves a security and/or accuracy of verifying access to and/or ownership of the website. For example, in this case, not only does an individual need to have a set of credentials for accessing the website, but the individual also needs to have placed the verification indicator in the proper location (e.g., a malicious actor who does not administer the website may not have the skills and/or knowledge of the website to place the verification indicator in the proper location).

When processing the code, the website verification platform may execute the code, may parse the code (e.g., by identifying delimiters in the code, using a text processing technique, and/or the like), and/or the like. For example, the website verification platform may cause a web page to be generated, may identify particular delimiters in the code (depending on a syntax of the programming language used for the code), and/or the like. When processing the set of files, the website verification platform may parse file names of the set of files, file extensions, information included in the set of files (e.g., code, text documentation for the code, and/or the like), and/or the like using a text processing technique. For example, the website verification platform may identify particular files or types of files included in the set of files based on terms, or sets of characters, included in the file names, file extensions, information, and/or the like associated with the set of files.

In some implementations, the web site verification platform may detect the verification indicator based on a particular delimiter included in the code. For example, the website verification platform may detect the verification indicator based on a set of delimiters that identifies the presence of the verification indicator, such as a set of delimiters associated with a particular code snippet, with a unique identifier, and/or the like. Additionally, or alternatively, the website verification platform may detect the verification indicator based on a particular tag indicator included in the code. For example, and based on the syntax of the programming language used for the website, particular starting and ending tag indicators may be included in the code to indicate a presence of a verification indicator and the website verification platform may detect the verification indicator between the particular starting and ending tag indicators, based on the presence of the particular starting and ending tag indicators, and/or the like. Additionally, or alternatively, the website verification platform may detect the verification indicator based on generation of a particular web page associated with the website. For example, and based on executing and/or parsing the code and/or the set of files, the website verification platform may detect that the code and/or the set of files would cause a particular web page to be generated, such as a new web page associated with new code included in the code and/or the set of files (e.g., the web page https://www.site.com/accessproof described above).

Referring to the specific example described above in connection with reference numbers 130 and 135, the website verification platform may process the code shown by reference number 130 in the manner described above. In this case, the website verification platform may detect that the code includes commented code (by detecting the "<!--" and "-->" delimiters). In addition, the website verification platform may detect that the commented code includes a unique identifier as the verification indicator (shown as "001KL347811").

The website verification platform may determine, after detecting the verification indicator and/or based on the verification indicator, to communicate with a particular device. For example, the website verification platform may determine that the device that provided the request for which the verification indicator included in the code and/or the set of files is associated with an individual for which ownership of and/or access to the website is verified. In some implementations, and similar to that described elsewhere herein, the verification indicator may indicate the device that provided the request for which the verification indicator was generated, and the website verification platform may determine to communicate with the device based on the verification indicator detected. For example, and as described above, the verification indicator may be unique to a request for verification, and as a result, may indicate a particular device, individual, and/or the like associated with the request. In this case, the website verification platform may determine to communicate with the other device based on the particular verification indicator detected (e.g., based on a unique identifier for the device, the individual, and/or the like used to form the verification indicator).

Referring to the specific example described above in connection with reference numbers 130 and 135, the website verification platform may determine to communicate with the user device based on the unique identifier (shown as "001KL347811") being included in the code. For example, the unique identifier may identify the user device as the device that requested the verification, and the website verification platform may determine to communicate with the user device, even if other devices made requests for verification for the same website. This improves a security of communications post-verification by reducing or eliminating communication with devices that may be associated with fraudulent or malicious requests for verification.

In the case where the website verification platform detects multiple verification indicators, the website verification platform may request additional information from device(s) associated with the multiple verification indicators to verify access to the website, such as by requesting a set of credentials associated with the website from the device(s). For example, the website verification platform may send a message to the device(s), may cause a user interface to be provided for display via the device(s), and/or the like to request input of the set of credentials. In the case where the website verification platform fails to detect the verification indicator, the website verification platform may determine to not perform further operations related to verifying access to the website, may send a message to the device associated with a request for verification indicating that the website verification platform failed to detect a verification indicator, and/or the like.

Figure 1C:
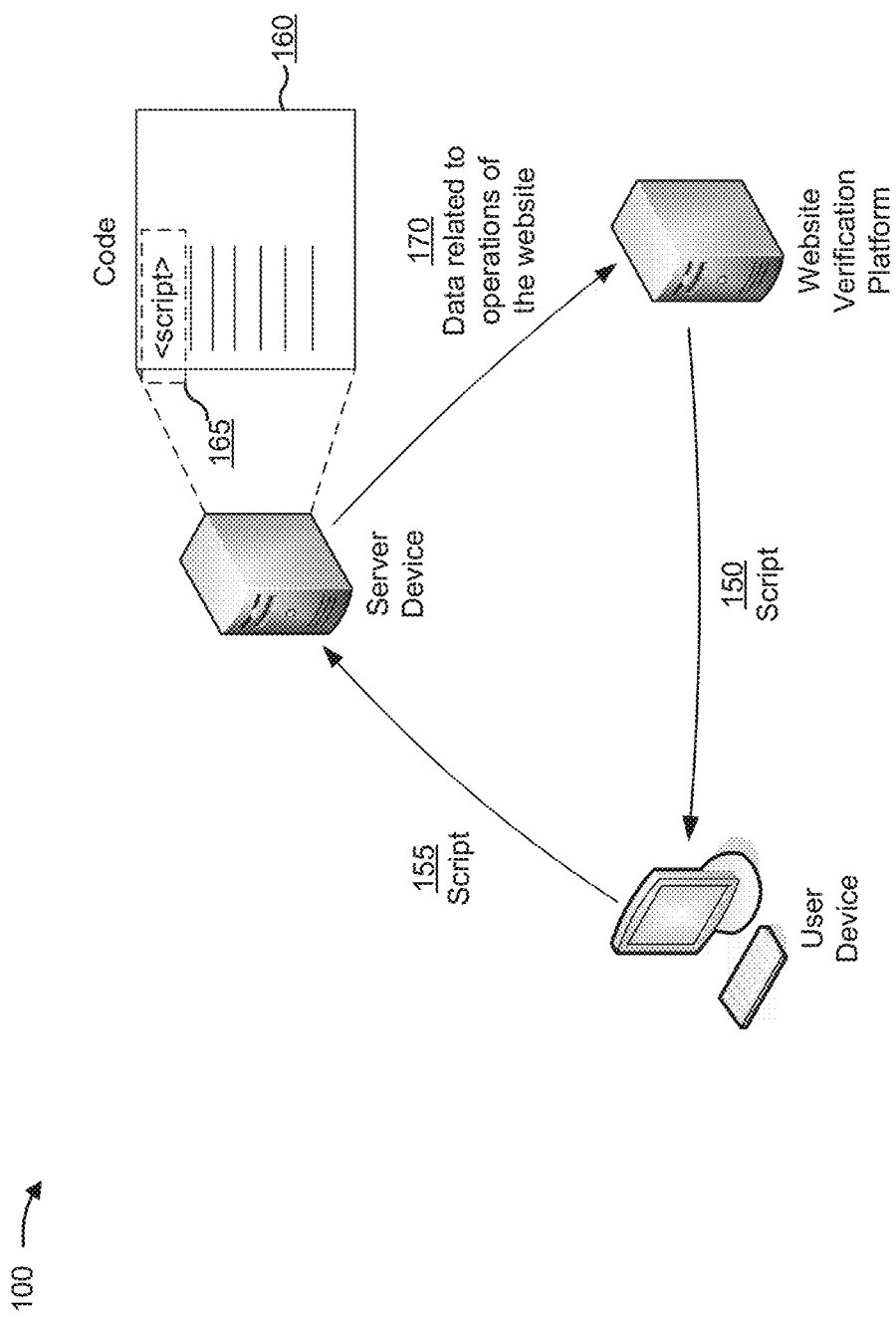

Turning to FIG. 1C, and as shown by reference number 150, the website verification platform may provide, to the user device, a script. For example, the website verification platform may provide the script after accessing the website, after detecting the verification indicator, after determining to communicate with the user device, and/or the like. In some implementations, the script is to be included in the code associated with the website. For example, the script may include a code snippet that is to be included in the code associated with the website. In some implementations, the script may be associated with monitoring operations of the website, with gathering data related to the operations of the website and providing the data to a device, and/or the like. For example, when the script is executed by the server device, the script may cause the server device to gather data related to the operations of the website, to provide the data to another device (e.g., the website verification platform or another server device), and/or the like. The website verification platform may provide a set of instructions in association with providing the script. For example, the set of instructions may identify a location in the code in which to include the script.

As shown by reference number 155, the user device may provide the script to the server device. For example, the user device may provide the script to the server device after receiving the script from the website verification platform, in a manner similar to that described above with regard to providing the verification indicator, and/or the like. Reference number 160 shows a representation of code associated with the website. As shown by reference number 165, the script may be included in the code associated with the website based on the user device providing the script to the server device. For example, a user of the user device may include the script in code for a particular web page of the website via an administrator account.

As shown by reference number 170, the server device may provide, to the website verification platform, data related to operations of the website. For example, execution of the script may cause the server device to provide data related to the operations of the website to the website verification platform after the server device receives the script from the user device. The server device may provide the data in real-time or near real-time (e.g., as the data is generated), in batch, based on receiving a request for the data from the website verification platform, and/or the like. The data may be related to various metrics, such as a quantity of visitors to the website, a quantity of transactions completed via the website, a dollar value of the transactions, a click through rate of advertisements displayed on the website, a quantity of different items and/or services sold through the website, and/or the like. The data may include thousands, millions, or more data elements for hundreds, thousands, or more metrics. In this way, the data that the website verification platform receives may be too large for conventional computing resources to process.

Figure 1D:
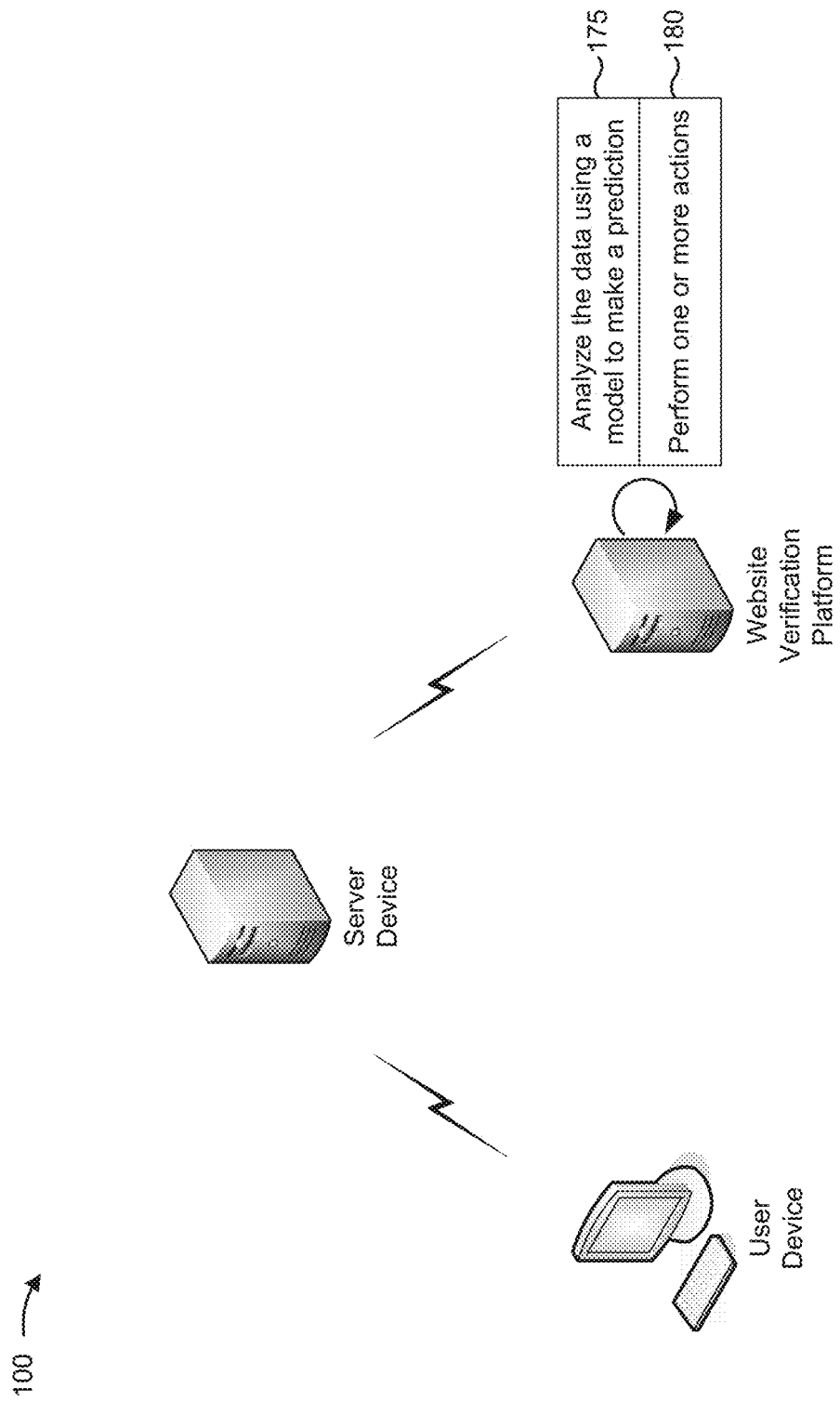

Turning to FIG. 1D, and as shown by reference number 175, the website verification platform may analyze the data using a model to make a prediction. For example, the website verification platform may process the data after receiving the data from the server device. The model may be associated with making a prediction related to operations of the website (e.g., output from the model may include a prediction related to operations of the website). For example, the model may be associated with making a prediction related to a value to be received via the website (e.g., a revenue, a profit, and/or the like of the website), traffic associated with the website (e.g., future traffic of the website, a conversion rate of traffic to the website, and/or the like), a value of the website (e.g., a value of the website if the website were to be sold, a value relative to other similar websites), and/or the like.

To analyze the data, the website verification platform may input the data into the model. For example, the website verification platform may input the data into the model after removing outliers from the data, after selecting a portion of the data from a particular time period, and/or the like. The model may process the data to identify a trend, a pattern, and/or the like in the data (e.g., a trend, pattern, and/or the like over time, during a time period, and/or the like). The model may output information that identifies a prediction related to operations of the website based on processing the data. For example, the model may output a prediction related to a value to be received via the website, traffic associated with the website, a value of the website, and/or the like based on having been trained on trends, patterns, and/or the like of data of other websites, based on performing a comparison of trends, patterns, and/or the like of the website and another web site, and/or the like.

Additionally, or alternatively, the model may output a score that identifies a confidence level associated with the prediction (e.g., that identifies a degree to which the data matches historical data of one or more other websites, that identifies a likelihood of an accuracy of the prediction, and/or the like). The website verification platform may aggregate scores for a set of predictions related to a website. For example, the website verification platform may average the scores, may determine a weighted score, and/or the like. In some implementations, the website verification platform may use one or more scores associated with the website to analyze risks associated with the website. For example, a low confidence score associated with a prediction may indicate a high degree of risk associated with the prediction and/or with the website, and vice versa. Continuing with the previous example, if the model outputs a predicted value of the website but with a low score, the website verification platform may determine that the website is associated with a high degree of risk with respect to the predicted value of the website, and vice versa.

As described in more detail below, the website verification platform may use output from the model to perform various actions and/or to make various determinations related to the website. For example, the website verification platform may use a prediction and/or a corresponding score to make a determination regarding a risk associated with the website. Continuing with the previous example, if the prediction and/or the score relates to a value to be received via the website, the website verification platform may make a determination related to risks associated with the value (e.g., the website verification platform may determine a high risk based on a prediction and/or a score failing to satisfy a threshold, based on the prediction and/or the score indicating a low confidence of a threshold amount of value to be received via the website, and/or the like). Based on making a determination related to the risks, the website verification platform may make determinations related to underwriting a loan for the owner of the website, offering a line of credit to the owner of the website, and/or the like. For example, if the website verification platform makes a determination of a low risk associated with a prediction of a threshold value to be received, the website verification platform may determine to approve the web site for underwriting of a loan, to approve the website for a line of credit, and/or the like, or vice versa.

A model described herein may be a machine learning model. The website verification platform may generate a machine learning model via training of the machine learning model, may receive a trained machine learning model (e.g., that another device has trained), and/or the like. For example, the website verification platform may train the machine learning model to output a score that indicates a confidence level associated with a prediction, a degree to which the data matches historical data on which the machine learning model was trained, and/or the like.

The website verification platform may train the machine learning model on a training set of data. For example, the training set of data may include historical data related to historical operations of other websites, and data that identifies results of various analyses of the historical data, outcomes for the operations of the other websites, and/or the like. Additionally, or alternatively, when the website verification platform inputs the historical data into the machine learning model, the website verification platform may input a first portion of the historical data as a training set of data (e.g., to train a machine learning model), a second portion of the historical data as a validation set of data (e.g., to evaluate an effectiveness of the training of the machine learning model and/or to identify needed modifications to the training of the machine learning model), and a third portion of the historical data as a test set of data (e.g., to evaluate a finalized machine learning model after training and adjustments to the training using the first portion of the historical data and the second portion of the historical data). The website verification platform may perform multiple iterations of training of the machine learning model, depending on an outcome of testing of the machine learning model (e.g., by submitting different portions of the historical data as the training set of data, the validation set of data, and the test set of data).

When training the machine learning model, the website verification platform may utilize a random forest classifier technique to train the machine learning model. For example, the website verification platform may utilize a random forest classifier technique to construct multiple decision trees during training and may output a classification of historical data. Additionally, or alternatively, when training the machine learning model, the website verification platform may utilize one or more gradient boosting techniques to generate the machine learning model. For example, the website verification platform may utilize an xgboost classifier technique, a gradient boosting tree, and/or the like to generate a prediction model from a set of weak prediction models.

When training the machine learning model, the website verification platform may utilize logistic regression to train the machine learning model. For example, the website verification platform may utilize a binary classification of the historical data (e.g., whether the historical data is indicative of a particular accurate prediction) to train the machine learning model. Additionally, or alternatively, when training the machine learning model, the website verification platform may utilize a naïve Bayes classifier to train the machine learning model. For example, the website verification platform may utilize binary recursive partitioning to divide the historical data into various binary categories (e.g., starting with whether the historical data is indicative of a particular accurate prediction). Based on using recursive partitioning, the website verification platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the website verification platform may utilize a support vector machine (SVM) classifier. For example, the website verification platform may utilize a linear model to implement non-linear class boundaries, such as via a max margin hyperplane. Additionally, or alternatively, when utilizing the SVM classifier, the website verification platform may utilize a binary classifier to perform a multi-class classification. Use of an SVM classifier may reduce or eliminate overfitting, may increase a robustness of the machine learning model to noise, and/or the like.

In some implementations, the web site verification platform may train the machine learning model using a supervised training procedure that includes receiving input to the machine learning model from a subject matter expert. In some implementations, the website verification platform may use one or more other model training techniques, such as a neural network technique, a latent semantic indexing technique, and/or the like. For example, the website verification platform may perform a multi-layer artificial neural network processing technique (e.g., using a two-layer feed-forward neural network architecture, a three-layer feedforward neural network architecture, and/or the like) to perform pattern recognition with regard to patterns of historical data for other websites, and/or the like. In this case, use of the artificial neural network processing technique may improve an accuracy of a supervised learning model generated by the website verification platform by being more robust to noisy, imprecise, or incomplete data, and by enabling the website verification platform to detect patterns and/or trends undetectable to human analysts or systems using less complex techniques.

As an example, the website verification platform may use a supervised multi-label classification technique to train the machine learning model. For example, as a first step, the website verification platform may map historical data associated with other websites to a set of previously generated models after labeling the historical data. In this case, the classification of historical data and/or other websites may be characterized as having been accurately or inaccurately predicted, and/or the like (e.g., by a technician, thereby reducing processing relative to the website verification platform being required to analyze each website).

As a second step, the website verification platform may determine classifier chains, whereby labels of target variables may be correlated (e.g., in this example, labels may be a result of a historical prediction and correlation may refer to historical predictions common to the different labels, and/or the like). In this case, the website verification platform may use an output of a first label as an input for a second label (as well as one or more input features, which may be other historical data relating to the other websites), and may determine a likelihood that a particular website is to be associated with at least one classification based on a similarity to other websites that are associated with similar data. In this way, the website verification platform transforms classification from a multilabel-classification problem to multiple single-classification problems, thereby reducing processing utilization.

As a third step, the website verification platform may determine a Hamming Loss Metric relating to an accuracy of a label in performing a classification by using the validation set of the historical data (e.g., an accuracy with which a weighting is applied to each website and whether each website is associated with a particular classification, results in a correct classification, and/or the like, thereby accounting for variations among historical data for different websites).

As a fourth step, the website verification platform may finalize the machine learning model based on labels that satisfy a threshold accuracy associated with the Hamming Loss Metric, and may use the machine learning model for subsequent determination of other models.

As another example, the website verification platform may determine, using a linear regression technique, that a threshold percentage of values of data elements, in a set of values of data elements, do not indicate a particular or threshold likelihood for a prediction, and may determine that those values of data elements are to receive relatively low association scores. In contrast, the website verification platform may determine that another threshold percentage of values of data elements indicates a particular or threshold likelihood for the prediction, and may assign a relatively high association score to those values of data elements. Based on the characteristics of the data elements indicating a likelihood of prediction, or not, the website verification platform may generate the model and may use the model for analyzing new data elements related to a new website that the website verification platform receives.

Accordingly, the website verification platform may use artificial intelligence techniques, machine learning techniques, deep learning techniques, and/or the like to determine a likelihood of an accurate prediction for a website, as described herein.

In some implementations, the web site verification platform may generate a model and may use the model to perform various processing described herein. For example, based on historical data relating to hundreds, thousands, millions or more websites, the website verification platform may determine a likelihood of an accurate prediction for a website. In this case, the model may be an item-based collaborative filtering model, a single value decomposition model, a hybrid recommendation model, and/or another type of model that enables various determinations described herein based on data, metadata, indicators, and/or the like.

As shown by reference number 180, the website verification platform may perform one or more actions. For example, the website verification platform may perform the one or more actions after analyzing the data using the model. Continuing with the previous example, the website verification platform may perform the one or more actions based on a result of analyzing the data using the model (e.g., based on a prediction output by the model, based on a score associated with a prediction, and/or the like).

In some implementations, the web site verification platform may determine a set of services to be offered to the individual associated with the website (e.g., that owns and/or has access to the website). For example, the set of services may include marketing services, line of credit services, loan services, and/or the like based on a set of predictions and/or scores related to the website. In this case, the website verification platform may generate a report that includes information identifying the set of services and may provide the report to the user device for display.

Additionally, or alternatively, the website verification platform may cause an individual associated with the website (e.g., an owner of the website) and/or the website to be approved or denied for a line of credit, to be approved or denied for loan underwriting, and/or the like based on a set of predictions and/or scores associated with the website. For example, if a set of predictions and/or corresponding scores indicate a threshold amount of risk associated with the website, the website verification platform may cause the individual and/or the website to be approved or denied for the line of credit, for the loan underwriting, and/or the like. As a specific example, the set of predictions may indicate a low predicted value of the website, or the corresponding scores may indicate a low confidence level associated with the predicted value of the website. In this case, the website verification platform may cause the individual and/or the website to be denied for the line of credit, for the loan underwriting, and/or the like, or vice versa. In some implementations, the website verification platform may configure information in a data structure that indicates that the individual and/or the website has been approved or denied for the line of credit, for the loan underwriting, and/or the like. For example, the data structure may be stored by the individual and/or the website verification platform or by another device. In some implementations, the web site verification platform may send a message to the user device to indicate whether the individual and/or the website has been approved or denied.

Additionally, or alternatively, the website verification platform may generate a report that includes information identifying the result of the analyzing. For example, the website verification platform may generate a report that includes information identifying various predictions and/or corresponding scores output by the model. In some implementations, the website verification platform may provide the report for display via the user device after generating the report.

Additionally, or alternatively, the website verification platform may trigger an alarm. For example, the website verification platform may trigger an alarm in an account, on a device, and/or the like that indicates a set of predictions for a website and/or corresponding scores for the set of predictions, a particular result of analyzing the data, and/or the like. Additionally, or alternatively, the website verification platform may populate an interface associated with an account that indicates a set of predictions, corresponding scores for the set of predictions, approval or denial results, and/or the like for the website. For example, the account may be associated with an application for a line of credit, for loan underwriting, and/or the like.

Additionally, or alternatively, the website verification platform may flag a website for manual review. For example, the website verification platform may flag the website based on the website being approved, being denied, having a score within a threshold of being approved or denied, and/or the like. Continuing with the previous example, the website verification platform may flag the website by configuring information in a data structure that identifies the website, by configuring an indicator to be provided for display in an account of an individual to perform the manual review, and/or the like.

Additionally, or alternatively, the website verification platform may cause a value to be transferred to an account associated with the website. For example, the web site verification platform may cause an amount of money to be transferred from another account to the account by sending a set of instructions to various devices associated with the accounts. In some implementations, the website verification platform may request approval of the transfer from an individual by sending a message to a device associated with the individual, by configuring a user interface with the request, and/or the like.

In this way, the website verification platform provides a tool that can be used to more quickly, more accurately, and more securely verify ownership of and/or access to a website's data and/or code relative to other ways of verifying ownership and/or access. This conserves processing resources that would otherwise be consumed as a result of an inaccurate verification (e.g., resulting in a need to re-verify), due to malicious actors that may obtain sensitive information during the verification process, and/or the like. In addition, in this way, the website verification platform provides a tool that can be used to analyze website analytics as part of operations for determining loan underwriting risks, line of credit risks, and/or the like (e.g., in real-time or near real-time). This facilitates analyses, generation of predictions, and/or the like for a website in a manner not previously possible.

As indicated above, FIGS. 1A-1D are provided as one or more examples. Other examples may differ from what is described with regard to FIGS. 1A-1D.

Figure 2A:
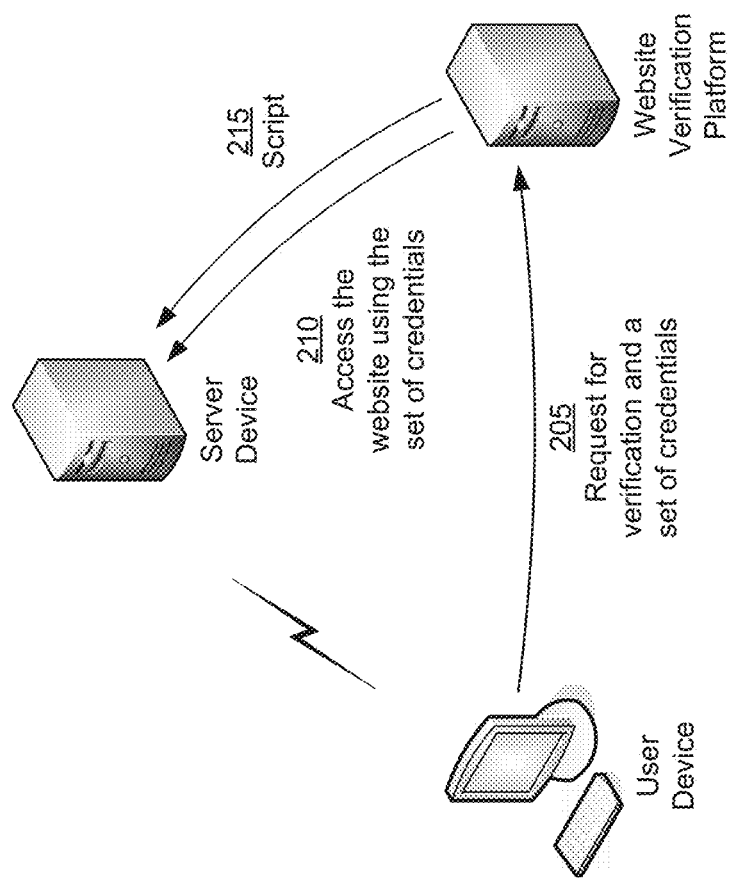
Figure 2B:
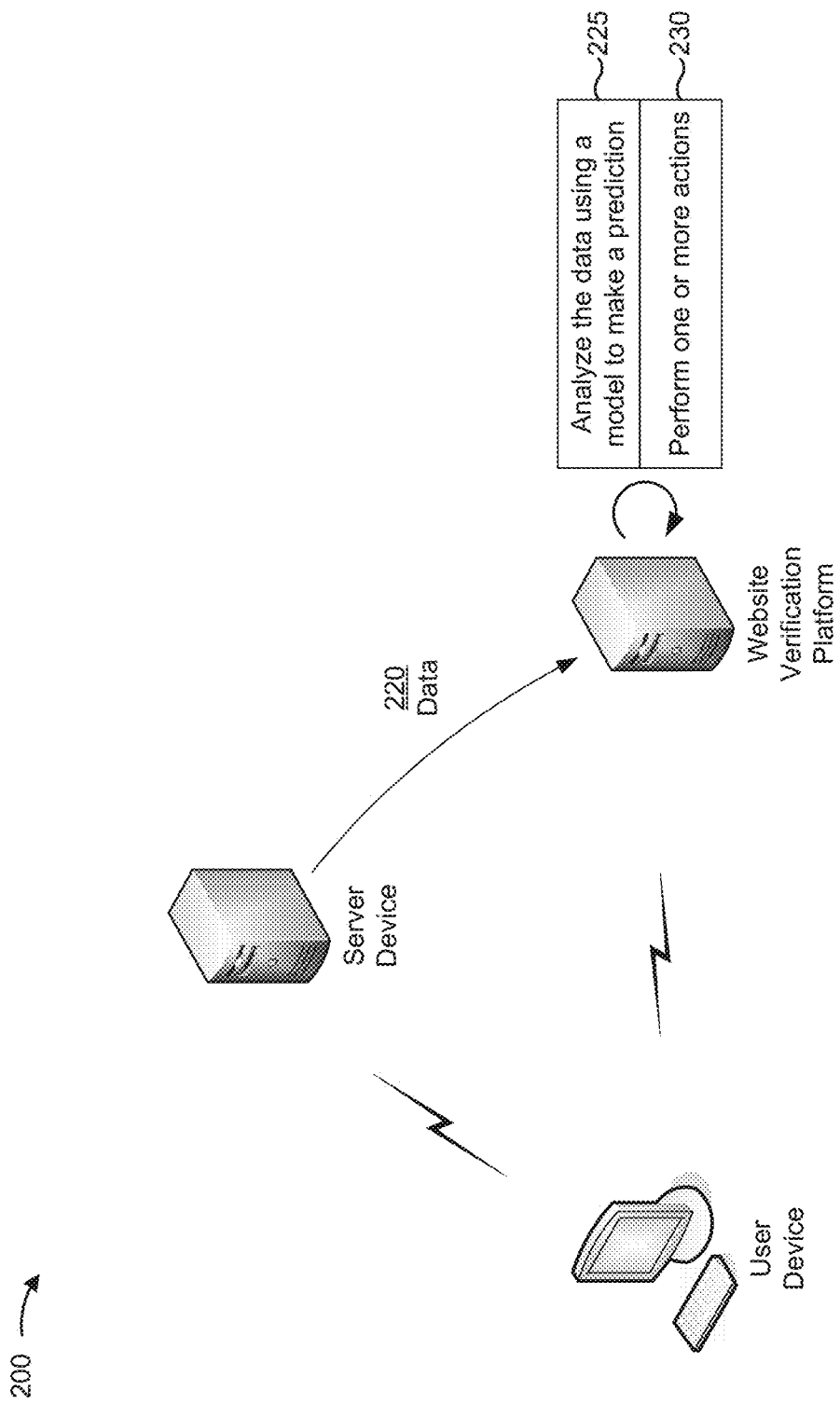

FIGS. 2A and 2B are diagrams of one or more example implementations 200 described herein. As shown in FIGS. 2A and 2B, implementation(s) 200 include a user device, a server device, and a website verification platform, similar to that described elsewhere herein.

As shown by reference number 205, the user device may provide a request for verification and a set of credentials in a manner similar to that described elsewhere herein. For example, the request may be associated with verifying access to and/or ownership of a website and the set of credentials may be associated with accessing the website. As shown by reference number 210, the website verification platform may access the website using the set of credentials in a manner similar to that described elsewhere herein. For example, the website verification platform may follow a URL to a web page associated with accessing code and/or files associated with the website (e.g., to a web page associated with an administrator account of the website), and may provide the set of credentials to the server device to access the code and/or the files (e.g., by inputting the set of credentials into a user interface, by sending the set of credentials to the server device in a message, and/or the like).

As shown by reference number 215, after accessing the website, the website verification platform may provide a script to the server device in a manner similar to that described elsewhere herein. For example, the website verification platform may identify a particular document of code in which to include the script based on a name of the particular document (e.g., a name that was provided to the website verification platform from a user of the user device, a name that includes a particular term or phrase, such as "index" or "homepage," and/or the like), may identify a particular location within the document of code to include the script (e.g., may identify a beginning of the code in the document, may identify a particular tag indicator in the code, and/or the like as the location), and may include the script in the document of code. In this way, the website verification platform may configure code associated with the website with a script.

Turning to FIG. 2B, and as shown by reference number 220, the server device may provide, to the website verification platform, data related to operations of the website in a manner similar to that described elsewhere herein. For example, the server device may provide the data based on the script being included in the code of the website. As shown by reference number 225, the website verification platform may analyze the data using a model to make a prediction in a manner similar to that described elsewhere herein. For example, the website verification platform may analyze the data after receiving the data. As shown by reference number 230, the website verification platform may perform one or more actions in a manner similar to that described elsewhere herein. For example, the website verification platform may perform the one or more actions after analyzing the data.

As indicated above, FIGS. 2A and 2B are provided as one or more examples. Other examples may differ from what is described with regard to FIGS. 2A and 2B.

Figure 3:
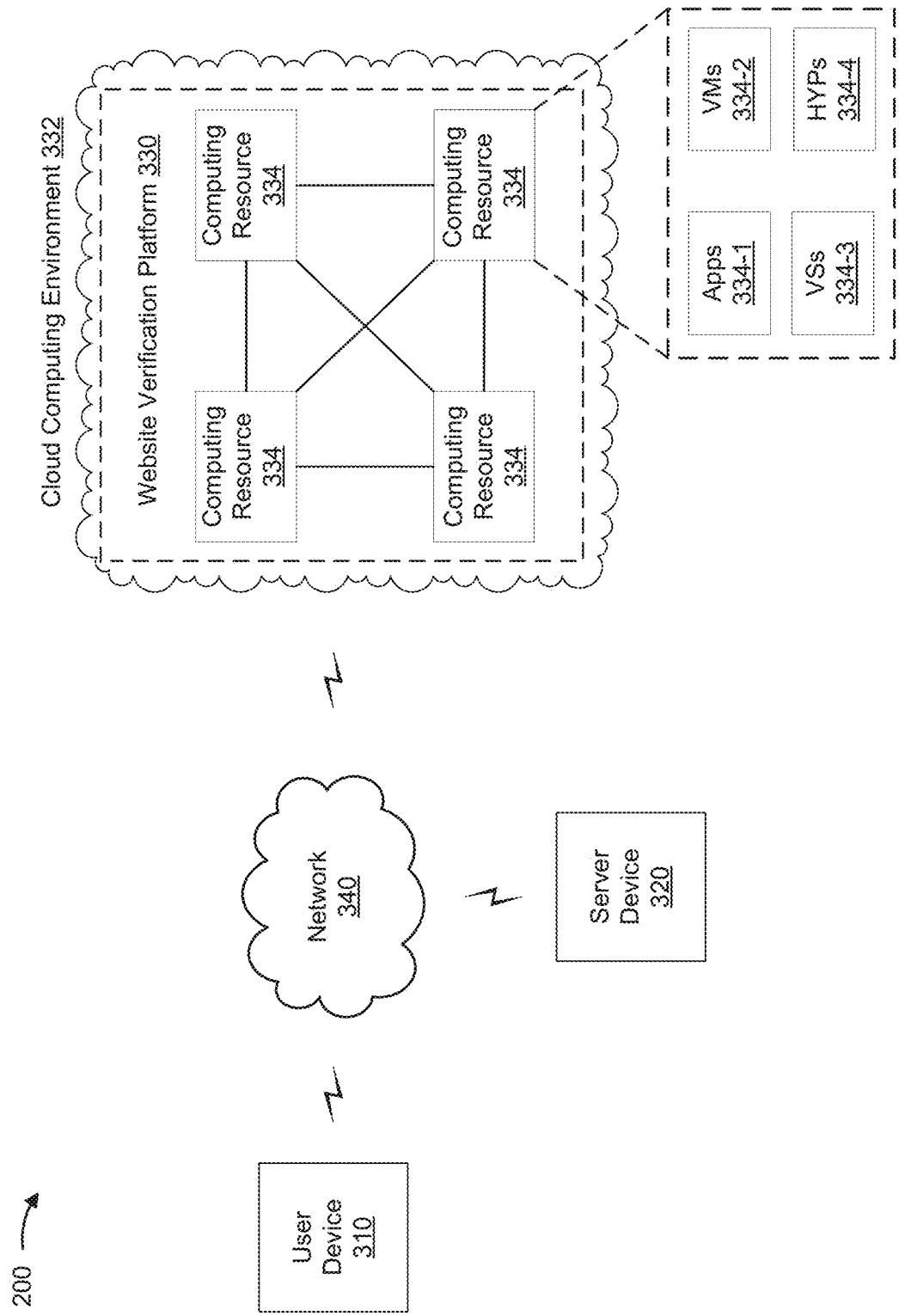
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a user device 310, a server device 320, a website verification platform 330 hosted within a cloud computing environment 332 that includes a set of computing resources 334, and a network 340. Devices of environment 300 may interconnect via wired connections, wireless connections, or a combination of wired and wireless connections.

User device 310 includes one or more devices capable of receiving, generating, storing, processing, and/or providing data described herein. For example, user device 310 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, and/or the like), a desktop computer, a set-top box, or a similar type of device. In some implementations, user device 310 may provide, to website verification platform 330, a request for verification of access to a website and/or ownership of the website, as described elsewhere herein.

Server device 320 includes one or more devices capable of receiving, generating storing, processing, and/or providing data described herein. For example, server device 320 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 320 may include a communication interface that allows server device 320 to receive information from and/or transmit information to other devices in environment 300. In some implementations, server device 320 may be a physical device implemented within a housing, such as a chassis. In some implementations, server device 320 may be a virtual device implemented by one or more computer devices of a cloud computing environment or a data center. In some implementations, server device 320 may receive, from user device 310, a script to be included in code associated with a website, as described elsewhere herein. Additionally, or alternatively, server device 320 may provide, to website verification platform 330, data related to operations of the website, as described elsewhere herein.

Site verification platform 330 includes one or more devices capable of receiving, generating, storing, processing, and/or providing data described herein. For example, website verification platform 330 may include a cloud server or a group of cloud servers. In some implementations, website verification platform 330 may be designed to be modular such that certain software components can be swapped in or out depending on a particular need. As such, website verification platform 330 may be easily and/or quickly reconfigured for different uses.

In some implementations, as shown in FIG. 3, website verification platform 330 may be hosted in cloud computing environment 332. Notably, while implementations described herein describe website verification platform 330 as being hosted in cloud computing environment 332, in some implementations, website verification platform 330 may be non-cloud-based (i.e., may be implemented outside of a cloud computing environment) or may be partially cloud-based.

Cloud computing environment 332 includes an environment that hosts website verification platform 330. Cloud computing environment 332 may provide computation, software, data access, storage, and/or other services that do not require end-user knowledge of a physical location and configuration of a system and/or a device that hosts website verification platform 330. As shown, cloud computing environment 332 may include a group of computing resources 334 (referred to collectively as "computing resources 334" and individually as "computing resource 334").

Computing resource 334 includes one or more personal computers, workstation computers, server devices, or another type of computation and/or communication device. In some implementations, computing resource 334 may host website verification platform 330. The cloud resources may include compute instances executing in computing resource 334, storage devices provided in computing resource 334, data transfer devices provided by computing resource 334, etc. In some implementations, computing resource 334 may communicate with other computing resources 334 via wired connections, wireless connections, or a combination of wired and wireless connections.

As further shown in FIG. 3, computing resource 334 may include a group of cloud resources, such as one or more applications ("APPs") 334-1, one or more virtual machines ("VMs") 334-2, one or more virtualized storages ("VSs") 334-3, or one or more hypervisors ("HYPs") 334-4.

Application 334-1 includes one or more software applications that may be provided to or accessed by one or more devices of environment 300. Application 334-1 may eliminate a need to install and execute the software applications on devices of environment 300. For example, application 334-1 may include software associated with website verification platform 330 and/or any other software capable of being provided via cloud computing environment 332. In some implementations, one application 334-1 may send/receive information to/from one or more other applications 334-1, via virtual machine 334-2. In some implementations, application 334-1 may include a software application associated with one or more databases and/or operating systems. For example, application 334-1 may include an enterprise application, a functional application, an analytics application, and/or the like.

Virtual machine 334-2 includes a software implementation of a machine (e.g., a computer) that executes programs like a physical machine. Virtual machine 334-2 may be either a system virtual machine or a process virtual machine, depending upon use and degree of correspondence to any real machine by virtual machine 334-2. A system virtual machine may provide a complete system platform that supports execution of a complete operating system ("OS"). A process virtual machine may execute a single program, and may support a single process. In some implementations, virtual machine 334-2 may execute on behalf of a user (e.g., a user of user device 310), and may manage infrastructure of cloud computing environment 332, such as data management, synchronization, or long-duration data transfers.

Virtualized storage 334-3 includes one or more storage systems and/or one or more devices that use virtualization techniques within the storage systems or devices of computing resource 334. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 334-4 provides hardware virtualization techniques that allow multiple operating systems (e.g., "guest operating systems") to execute concurrently on a host computer, such as computing resource 334. Hypervisor 334-4 may present a virtual operating platform to the guest operating systems, and may manage the execution of the guest operating systems. Multiple instances of a variety of operating systems may share virtualized hardware resources.

Network 340 includes one or more wired and/or wireless networks. For example, network 340 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
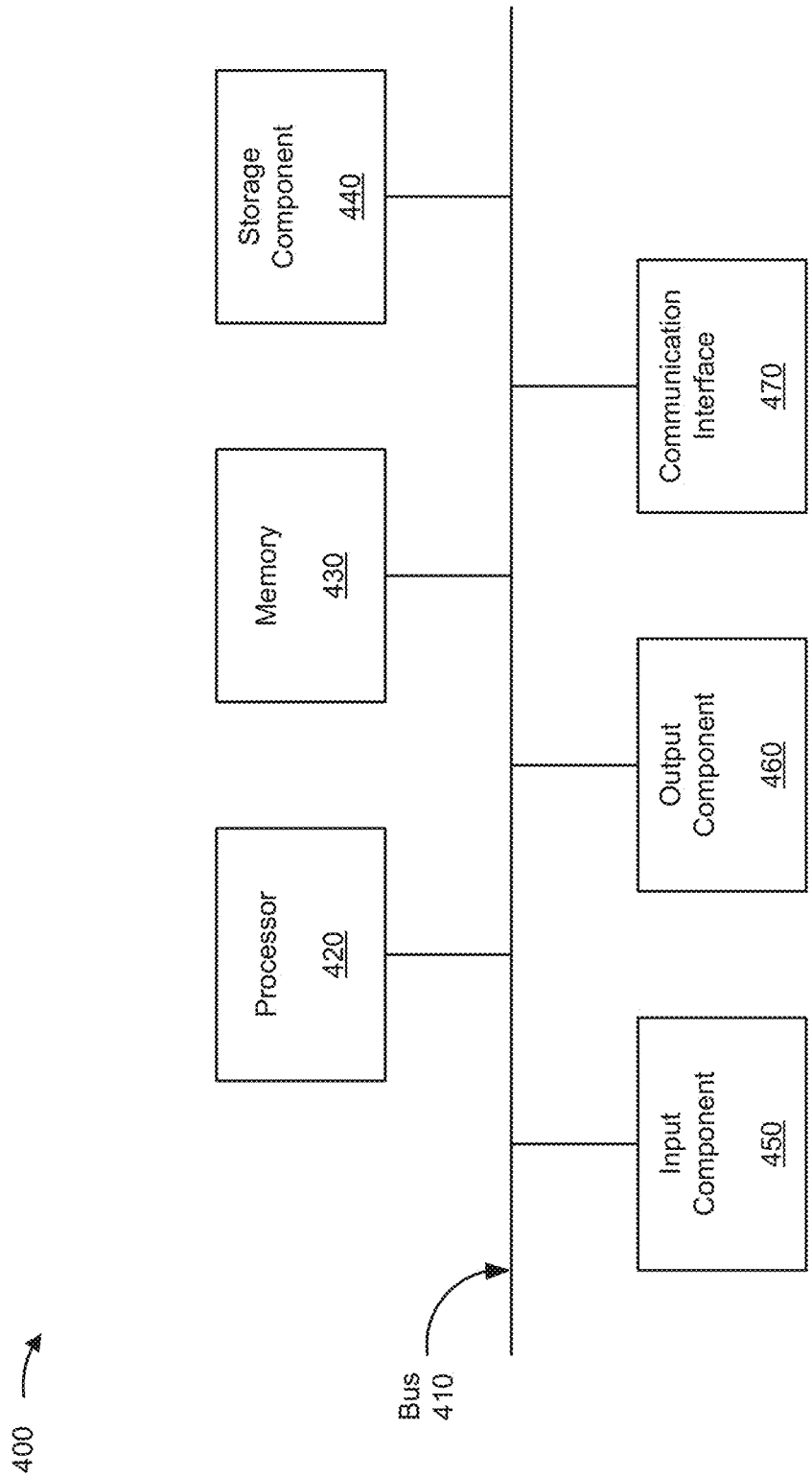
FIG. 4 is a diagram of example components of one or more devices of FIG. 3.

FIG. 4 is a diagram of example components of a device 400. Device 400 may correspond to user device 310, server device 320, website verification platform 330, and/or computing resource 334. In some implementations, user device 310, server device 320, website verification platform 330, and/or computing resource 334 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among multiple components of device 400. Processor 420 is implemented in hardware, firmware, and/or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a component for determining location (e.g., a global positioning system (GPS) component) and/or a sensor (e.g., an accelerometer, a gyroscope, an actuator, another type of positional or environmental sensor, and/or the like). Output component 460 includes a component that provides output information from device 400 (via, e.g., a display, a speaker, a haptic feedback component, an audio or visual indicator, and/or the like).

Communication interface 470 includes a transceiver-like component (e.g., a transceiver, a separate receiver, a separate transmitter, and/or the like) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a Wi-Fi interface, a cellular network interface, and/or the like.

Device 400 may perform one or more processes described herein. Device 400 may perform these processes based on processor 420 executing software instructions stored by a non-transitory computer-readable medium, such as memory 430 and/or storage component 440. As used herein, the term "computer-readable medium" refers to a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flow chart of an example process 500 related to a website verification platform. In some implementations, one or more process blocks of FIG. 5 may be performed by a website verification platform (e.g., website verification platform 330). In some implementations, one or more process blocks of FIG. 5 may be performed by another device or a group of devices separate from or including the website verification platform, such as a user device (e.g., user device 310), a server device (e.g., server device 320), a computing resource (e.g., computing resource 334), and/or the like.

As shown in FIG. 5, process 500 may include providing a verification indicator to another device associated with a website, wherein the verification indicator is associated with verifying access to the website by an individual associated with the other device (block 510). For example, the website verification platform (e.g., using computing resource 334, processor 420, output component 460, communication interface 470, and/or the like) may provide a verification indicator to another device associated with a website, as described above. In some implementations, the verification indicator is associated with verifying access to the website by an individual associated with the other device.

As further shown in FIG. 5, process 500 may include processing, after providing the verification indicator to the other device, code associated with the website (block 520). For example, the website verification platform (e.g., using computing resource 334, processor 420, and/or the like) may process, and after providing the verification indicator to the other device, code associated with the website, as described above.

As further shown in FIG. 5, process 500 may include detecting, to verify access to the website, that the verification indicator has been associated with the code based on processing the code (block 530). For example, the website verification platform (e.g., using computing resource 334, processor 420, and/or the like) may detect, by the device and to verify access to the website, that the verification indicator has been associated with the code based on processing the code, as described above.

As further shown in FIG. 5, process 500 may include providing, based on detecting the verification indicator, a script to the other device, wherein the script is to be included in the code associated with the website, wherein the script is associated with monitoring operations of the website (block 540). For example, the website verification platform (e.g., using computing resource 334, processor 420, output component 460, communication interface 470, and/or the like) may provide, based on detecting the verification indicator, a script to the other device, as described above. In some implementations, the script is to be included in the code associated with the website. In some implementations, the script is associated with monitoring operations of the website.

As further shown in FIG. 5, process 500 may include receiving, after providing the script to the other device, data related to the operations of the website (block 550). For example, the website verification platform (e.g., using computing resource 334, processor 420, memory 430, storage component 440, input component 450, communication interface 470, and/or the like) may receive, after providing the script to the other device, data related to the operations of the website, as described above.

As further shown in FIG. 5, process 500 may include analyzing the data related to the operations of the website using a model after receiving the data related to the operations of the website (block 560). For example, the website verification platform (e.g., using computing resource 334, processor 420, and/or the like) may analyze the data related to the operations of the website using a model after receiving the data related to the operations of the website, as described above.

As further shown in FIG. 5, process 500 may include performing one or more actions related to the website based on a result of the analyzing (block 570). For example, the website verification platform (e.g., using computing resource 334, processor 420, memory 430, storage component 440, output component 460, communication interface 470, and/or the like) may perform one or more actions related to the website based on a result of the analyzing, as described above.

Process 500 may include additional implementations, such as any single implementation or any combination of implementations described below and/or in connection with one or more other processes described elsewhere herein.

In some implementations, the web site verification platform may determine, prior to providing the verification indicator, a particular type of verification indicator to use as the verification indicator based on at least one of the code, or a security level associated with an account associated with the website. In some implementations, the website verification platform may generate, after determining the particular type of verification indicator to use, the verification indicator based on the code or the security level associated with the account.

In some implementations, the verification indicator includes at least one of a unique identifier included in commented code, other code that causes a particular page, associated with the website, to be generated when executed or parsed, or a text file stored in association with the code on a server device that hosts the website. In some implementations, the website verification platform may receive, from the other device and after providing the verification indicator to the other device, an indication that the verification indicator has been associated with the code, and may process, after receiving the indication from the other device and to verify access to the website, the code or a set of files to detect the at least one of the unique identifier, the other code, or the text file.

In some implementations, the website verification platform may access, after providing the verification indicator, the website using a uniform resource identifier (URI) for the website or a set of credentials associated with the website, and may process the code after accessing the website using the URI or the set of credentials. In some implementations, the website verification platform may determine, after detecting the verification indicator and based on the verification indicator, to communicate with the other device, wherein the verification indicator was generated based on a unique identifier for the other device, and may provide the script to the other device after determining to communicate with the other device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 related to a website verification platform. In some implementations, one or more process blocks of FIG. 6 may be performed by a website verification platform (e.g., website verification platform 330). In some implementations, one or more process blocks of FIG. 6 may be performed by another device or a group of devices separate from or including the website verification platform, such as a user device (e.g., user device 310), a server device (e.g., server device 320), a computing resource (e.g., computing resource 334), and/or the like.

As shown in FIG. 6, process 600 may include generating, to verify access to a website by an individual associated with the website, a verification indicator (block 610). For example, the website verification platform (e.g., using computing resource 334, processor 420, memory 430, storage component 440, and/or the like) may generate, to verify access to a website by an individual associated with the website, a verification indicator, as described above.

As further shown in FIG. 6, process 600 may include providing, after generating the verification indicator, the verification indicator to another device associated with the website (block 620). For example, the website verification platform (e.g., using computing resource 334, processor 420, output component 460, communication interface 470, and/or the like) may provide, after generating the verification indicator, the verification indicator to another device associated with the website, as described above.

As further shown in FIG. 6, process 600 may include accessing, after providing the verification indicator to the other device, the website using a uniform resource identifier (URI) or a set of credentials associated with the website (block 630). For example, the website verification platform (e.g., using computing resource 334, processor 420, communication interface 470, and/or the like) may access, after providing the verification indicator to the other device, the website using a uniform resource identifier (URI) or a set of credentials associated with the website, as described above.

As further shown in FIG. 6, process 600 may include processing, after accessing the website, code associated with the website (block 640). For example, the web site verification platform (e.g., using computing resource 334, processor 420, and/or the like) may process, after accessing the website, code associated with the website, as described above.

As further shown in FIG. 6, process 600 may include detecting, based on processing the code, that the verification indicator has been associated with the code (block 650). For example, the website verification platform (e.g., using computing resource 334, processor 420, and/or the like) may detect, based on processing the code, that the verification indicator has been associated with the code, as described above.

As further shown in FIG. 6, process 600 may include providing, based on detecting the verification indicator, a script to the other device, wherein the script is to be included in the code associated with the website, wherein the script is associated with monitoring operations of the website (block 660). For example, the website verification platform (e.g., using computing resource 334, processor 420, output component 460, communication interface 470, and/or the like) may provide, based on detecting the verification indicator, a script to the other device, as described above. In some implementations, the script is to be included in the code associated with the website. In some implementations, the script is associated with monitoring operations of the website.

As further shown in FIG. 6, process 600 may include receiving, after providing the script to the other device, data related to the operations of the website (block 670). For example, the website verification platform (e.g., using computing resource 334, processor 420, memory 430, storage component 440, input component 450, communication interface 470, and/or the like) may receive, after providing the script to the other device, data related to the operations of the website, as described above.

As further shown in FIG. 6, process 600 may include analyzing the data related to the operations of the website using a model after receiving the data related to the operations of the website (block 680). For example, the website verification platform (e.g., using computing resource 334, processor 420, and/or the like) may analyze the data related to the operations of the website using a model after receiving the data related to the operations of the website, as described above.

As further shown in FIG. 6, process 600 may include performing one or more actions related to the website based on a result of the analyzing (block 690). For example, the website verification platform (e.g., using computing resource 334, processor 420, memory 430, storage component 440, output component 460, communication interface 470, and/or the like) may perform one or more actions related to the website based on a result of the analyzing, as described above.

Process 600 may include additional implementations, such as any single implementation or any combination of implementations described below and/or in connection with one or more other processes described elsewhere herein.

In some implementations, the website verification platform may receive, from the other device and after providing the verification indicator to the other device, an indication that the verification indicator has been associated with the code, and may process, to verify access to the website by the individual, the code after receiving the indication from the other device. In some implementations, the web site verification platform may determine, after detecting the verification indicator and based on the verification indicator, to communicate with the other device, wherein the verification indicator was generated based on a unique identifier for the other device, and may provide the script to the other device after determining to communicate with the other device.

In some implementations, the model is associated with making a prediction related to operations of the website, and the prediction is related to at least one of: a value to be received via the website, or traffic associated with the website. In some implementations, the website verification platform may determine, based on the result of the analyzing, a set of services to be offered to the individual associated with the website, may generate, after determining the set of services, a report that includes information identifying the set of services, and may provide, after generating the report, the report to the other device for display.

In some implementations, the web site verification platform may generate a report that includes information identifying the result of the analyzing, and may provide the report for display via the other device after generating the report. In some implementations, the website verification platform may execute the code, or may parse the code.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIG. 7 is a flow chart of an example process 700 related to a website verification platform. In some implementations, one or more process blocks of FIG. 7 may be performed by a website verification platform (e.g., website verification platform 330). In some implementations, one or more process blocks of FIG. 7 may be performed by another device or a group of devices separate from or including the website verification platform, such as a user device (e.g., user device 310), a server device (e.g., server device 320), a computing resource (e.g., computing resource 334), and/or the like.

As shown in FIG. 7, process 700 may include providing a verification indicator to a device associated with a website, wherein the verification indicator is associated with verifying access to the website by an individual associated with the device (block 710). For example, the website verification platform (e.g., using computing resource 334, processor 420, output component 460, communication interface 470, and/or the like) may provide a verification indicator to a device associated with a website, as described above. In some implementations, the verification indicator is associated with verifying access to the website by an individual associated with the device.

As further shown in FIG. 7, process 700 may include detecting, after providing the verification indicator and to verify access to the website, that the verification indicator has been associated with code associated with the website based on processing the code (block 720). For example, the website verification platform (e.g., using computing resource 334, processor 420, communication interface 470, and/or the like) may detect, after providing the verification indicator and to verify access to the website, that the verification indicator has been associated with code associated with the website based on processing the code, as described above.

As further shown in FIG. 7, process 700 may include providing, based on detecting the verification indicator, a script to the device wherein the script is to be included in the code associated with the website, wherein the script is associated with monitoring operations of the website (block 730). For example, the website verification platform (e.g., using computing resource 334, processor 420, output component 460, communication interface 470, and/or the like) may provide, based on detecting the verification indicator, a script to the device wherein the script is to be included in the code associated with the website, as described above. In some implementations, the script is to be included in the code associated with the website. In some implementations, the script is associated with monitoring operations of the website.

As further shown in FIG. 7, process 700 may include receiving, after providing the script to the device, data related to the operations of the website (block 740). For example, the website verification platform (e.g., using computing resource 334, processor 420, memory 430, storage component 440, input component 450, communication interface 470, and/or the like) may receive, after providing the script to the device, data related to the operations of the website, as described above.

As further shown in FIG. 7, process 700 may include analyzing, after receiving the data, the data related to the operations of the website using a model, wherein the model is associated with making a prediction related to at least one of a value to be received via the website, or traffic associated with the website (block 750). For example, the website verification platform (e.g., using computing resource 334, processor 420, and/or the like) may analyze, after receiving the data, the data related to the operations of the website using a model, as described above. In some implementations, the model is associated with making a prediction related to at least one of: a value to be received via the website, or and traffic associated with the website.

As further shown in FIG. 7, process 700 may include performing one or more actions related to the website based on a result of the analyzing (block 760). For example, the website verification platform (e.g., using computing resource 334, processor 420, memory 430, storage component 440, output component 460, communication interface 470, and/or the like) may perform one or more actions related to the website based on a result of the analyzing, as described above.

Process 700 may include additional implementations, such as any single implementation or any combination of implementations described below and/or in connection with one or more other processes described elsewhere herein.

In some implementations, the website verification platform may receive a request for verification from the device prior to providing the verification indicator, may determine, after receiving the request for verification, a particular type of verification indicator to generate based on at least one of: the code, or a security level associated with an account associated with the individual, and may generate, after determining the particular type of verification indicator to use, the verification indicator based on the code or the security level associated with the account associated with the individual. In some implementations, the website verification platform may access, after providing the verification indicator, the website using a uniform resource identifier (URI) or a set of credentials associated with the website, wherein the URI or the set of credentials are received from the device in association with the request for verification, and may process the code after accessing the website using the URI or the set of credentials.

In some implementations, the website verification platform may determine, after detecting the verification indicator and based on the verification indicator, to communicate with the device, wherein the verification indicator was generated based on a unique identifier for the device, and may provide the script to the device after determining to communicate with the device. In some implementations, the website verification platform may cause, based on the result of the analyzing, the website to be approved or denied for a line of credit by configuring information in a data structure that indicates that the website has been approved or denied for the line of credit. In some implementations, the website verification platform may detect the verification indicator based on at least one of: a particular delimiter included in the code, a particular tag indicator included in the code, or generation of a particular page associated with the website based on executing or parsing the code.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   providing, by a device, a verification indicator with instruction information to another device associated with a website hosted by a server device, wherein the instruction information indicates a location associated with the website for including the verification indicator via the server device,
   wherein the verification indicator includes at least one of:
      a unique identifier included in commented code of the website,
      other code of the website that causes a particular page, associated with the website, to be generated when executed or parsed, or
      a text file stored on the server device that hosts the website;
   processing, by the device and after the providing the verification indicator to the other device, website code associated with the website;

detecting, by the device, that the verification indicator has been associated with the website code based on the processing the website code;
analyzing, by the device, based on the detecting that the verification indicator has been associated with the website, and based on using a model, data related to operations of the website to generate a prediction associated with the operations of the website;
generating, by the device, and based on using the model, a score that identifies a confidence level associated with the prediction,
  wherein the confidence level indicates a degree of risk associated with the website; and
performing, by the device and based on the generating the score, one or more actions related to the website.

2. The method of claim 1, wherein the other device provides access to one or more website files stored on the server device.

3. The method of claim 1, further comprising:
accessing the website code, via the other device, using a set of credentials associated with the website; and
wherein providing the verification indicator comprises:
  providing the verification indicator, via the other device, based on accessing the website code.

4. The method of claim 1, further comprising:
generating the verification indicator by hashing data associated with a request to generate the verification indicator.

5. The method of claim 1, further comprising:
identifying a pre-stored code snippet, from a plurality of pre-stored code snippets written in multiple programming languages, based on a programming language associated with the website code; and
generating the verification indicator using the pre-stored code snippet.

6. The method of claim 1, further comprising:
determining, prior to the providing the verification indicator, a particular verification indicator type based on at least one of:
  the website code, or
  a security level associated with an account associated with the website.

7. The method of claim 6, further comprising:
generating, after the determining the particular verification indicator type, the verification indicator based on the website code or the security level associated with the account.

8. A device, comprising:
one or more memories; and
one or more processors communicatively coupled to the one or more memories, configured to:
  provide a verification indicator with instruction information to another device associated with a website hosted by a server device, wherein the instruction information indicates a location associated with the website for including the verification indicator via the server device,
    wherein the verification indicator includes at least one of:
      a unique identifier included in commented code of the website,
      other code of the website that causes a particular page, associated with the website, to be generated when executed or parsed, or
      a text file stored on the server device that hosts the website;
  process, after the providing the verification indicator to the other device, website code associated with the website;
  detect that the verification indicator has been associated with the website code based on the processing the website code;
  analyze, based on the detecting that the verification indicator has been associated with the website, and based on using a model, data related to operations of the website to generate a prediction associated with the operations of the website;
  generate, based on using the model, a score that identifies a confidence level associated with the prediction,
    wherein the confidence level indicates a degree of risk associated with the website; and
  perform, based on the generating the score, one or more actions related to the website.

9. The device of claim 8, wherein the other device provides access to one or more website files stored on the server device.

10. The device of claim 8, wherein the one or more processors are further configured to:
access the website code, via the other device, using a set of credentials associated with the website; and
wherein the one or more processors, when providing the verification indicator, are configured to:
  provide the verification indicator, via the other device, based on accessing the website code.

11. The device of claim 8, wherein the one or more processors are further configured to:
generate the verification indicator by hashing data associated with a request to generate the verification indicator.

12. The device of claim 8, wherein the one or more processors are further configured to:
identify a pre-stored code snippet, from a plurality of pre-stored code snippets written in multiple programming languages, based on a programming language associated with the website code; and
generate the verification indicator using the pre-stored code snippet.

13. The device of claim 8, wherein the one or more processors are further configured to:
determine, prior to the providing the verification indicator, a particular verification indicator type based on at least one of:
  the website code, or
  a security level associated with an account associated with the website.

14. The device of claim 13, wherein the one or more processors are further configured to:
generate, after the determining the particular verification indicator type, the verification indicator based on the website code or the security level associated with the account.

15. A non-transitory computer-readable medium storing instructions, the instructions comprising:
one or more instructions that, when executed by one or more processors, cause the one or more processors to:
  provide a verification indicator with instruction information to another device associated with a website hosted by a server device, wherein the instruction information indicates a location associated with the website for including the verification indicator via the server device, wherein the verification indicator includes at least one of:
  a unique identifier included in commented code of the website,
  other code of the website that causes a particular page, associated with the website, to be generated when executed or parsed, or
  a text file stored on the server device that hosts the website;
process, after the providing the verification indicator to the other device, website code associated with the website;
detect that the verification indicator has been associated with the website code based on the processing the website code;
analyze, based on the detecting that the verification indicator has been associated with the website, and based on using a model, data related to operations of the website to generate a prediction associated with the operations of the website;
generate, based on using the model, a score that identifies a confidence level associated with the prediction,
  wherein the confidence level indicates a degree of risk associated with the website; and
perform, based on the generating the score, one or more actions related to the website.

16. The non-transitory computer-readable medium of claim 15, wherein the other device provides access to one or more website files stored on the server device.

17. The non-transitory computer-readable medium of claim 15, wherein the one or more instructions, when executed by the one or more processors, further cause the one or more processors to:
  access the website code, via the other device, using a set of credentials associated with the website; and
  wherein the one or more instructions, that cause the one or more processors to provide the verification indicator, cause the one or more processors to:
    provide the verification indicator, via the other device, based on accessing the website code.

18. The non-transitory computer-readable medium of claim 15, wherein the one or more instructions, when executed by the one or more processors, further cause the one or more processors to:
  generate the verification indicator by hashing data associated with a request to generate the verification indicator.

19. The non-transitory computer-readable medium of claim 15, wherein the one or more instructions, when executed by the one or more processors, further cause the one or more processors to:
  identify a pre-stored code snippet, from a plurality of pre-stored code snippets written in multiple programming languages, based on a programming language associated with the website code; and
  generate the verification indicator using the pre-stored code snippet.

20. The non-transitory computer-readable medium of claim 15, wherein the one or more instructions, when executed by the one or more processors, further cause the one or more processors to:
  determine, prior to the providing the verification indicator, a particular verification indicator type based on at least one of:
    the website code, or
    a security level associated with an account associated with the website.

* * * * *